(12) United States Patent
Shah

(10) Patent No.: US 9,329,906 B2
(45) Date of Patent: May 3, 2016

(54) VIRTUAL MACHINE MOBILITY USING RESOURCE POOLS

(75) Inventor: Nihar Shah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 13/228,444

(22) Filed: Sep. 9, 2011

(65) Prior Publication Data
US 2013/0067464 A1 Mar. 14, 2013

(51) Int. Cl.
*G06F 9/455* (2006.01)
*G06F 9/50* (2006.01)

(52) U.S. Cl.
CPC .......... *G06F 9/5077* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 6,336,134 B1 * | 1/2002 | Varma | 709/205 |
| 7,383,405 B2 | 6/2008 | Vega et al. | |
| 2010/0125665 A1 | 5/2010 | Simpson et al. | |
| 2010/0333088 A1 * | 12/2010 | Rogel et al. | 718/1 |

OTHER PUBLICATIONS

An Adaptive Resource Flowing Scheme amongst VMs in a VM-Based Utility Computing Ying Song, Yuzhong Sun, Hui Wang, Xining Song Published: 2007.*

Dynamic Virtual Private Environments in a Shared Cyberspace Cong Du pp. i, x, xi, 1-5, 22-46, 78-88, 104-114, and 132-134 Published: 2008.*

Provider-Independent use of the Cloud Terence Harmer, Peter Wright, Christina Cunningham, and Ron Perrott Published: 2009.* vApp: A Standards-based Container for Cloud Providers René W. Schmidt and Steffen Grarup Published: Dec. 2010.*

Open Virtualization Format Specification Distributed Management Task Force, Inc. DMTF Standard—Document Number: DSP0243; Version 1.0.0 Published: 2009.*

Interfaces for Placement, Migration, and Monitoring of Virtual Machines in Federated Clouds Erik Elmroth and Lars Larsson Published: 2009.*

Virtual System Profile Specification Distributed Management Task Force, Inc. DMTF Standard—Document Number: DSP1057; Version 1.0.0 Published: Apr. 22, 2010.*

Allocation Capabilities Profile Specification Distributed Management Task Force, Inc. DMTF Standard—Document Number: DSP1043; Version 1.0.0 Published: Jun. 22, 2009.*

"Simplify Virtual Machine Management and Migration with Ethernet Fabrics in the Datacenter", Retrieved at <<http://www.brocade.com/downloads/documents/technical_briefs/technical_briefs_partners/brocade-ms-ethernet-fabric-solution-blueprint.pdf>>, Mar. 2011, p. 20.

(Continued)

*Primary Examiner* — Dong Kim
*Assistant Examiner* — Paul Mills
(74) *Attorney, Agent, or Firm* — John Jardine; Judy Yee; Micky Minhas

(57) ABSTRACT

In one embodiment, a portable virtual machine may use a generic resource allocation request to access a host resource. A virtualization host may receive a generic resource allocation request 400 from a portable virtual machine 302. The virtualization host may provide a host resource to the portable virtual machine 302 based on the generic resource allocation request 400.

20 Claims, 12 Drawing Sheets

(56) References Cited

OTHER PUBLICATIONS

"Maximize Data Center Flexibility Today and Tomorrow with Intel® Virtualization Technology (Intel® VT) FlexMigration Assist", Retrieved at <<http://communities.intel.com/servlet/JiveServlet/downloadBody/2013-102-1-2806/08-498_FlexMigration_WP_FIN_hires.pdf>>, Aug. 2008, p. 4.

Verma, et al., "CosMig: Modeling the Impact of Reconfiguration in a Cloud", 19th Annual Meeting of the IEEE International Symposium on Modeling, Analysis and simulation of computer and Telecommunication Systems, Retrieved at <<http://sites.google.com/site/akshatverma/publications/paper.pdf>>, Jul. 25-27, 2011, p. 9.

"Resource Management with VMware DRS", Retrieved at <<http://www.vmware.com/pdf/vmware_drs_wp.pdf>>, Retrieved Date: Jun. 21, 2011, p. 24.

"Anywhere-to-Anywhere Automated Conversions between Physical Servers, Virtual Machines and Image Archives", Retrieved at http://www.searchdatacenter.de/fileserver/vogelonline/companyfiles/443.pdf>>, Retrieved Date: Jun. 21, 2011, p. 4.

"Resource Allocation Profile", Distributed Management Task Force, Inc., Retrieved at <<http://www.dmtf.org/sites/default/files/standards/documents/DSP1041_1.1.0.pdf>>, Jun. 25, 2009, p. 51.

"System Virtualization Profile", Distributed Management Task Force, Inc., Retrieved at <<http://www.dmtf.org/sites/default/files/standards/documents/DSP1042_1.0.0_0.pdf>>, Apr. 22, 2010, p. 83.

* cited by examiner

*200*

*250*

| VM ID 410 | RESOURCE POOL ALIAS 420 | CONFIGURATION SPECIFICATION 430 | RESOURCE CRITERION 440 |
|---|---|---|---|

VIRTUAL MACHINE MOBILITY USING RESOURCE POOLS

BACKGROUND

A virtual machine operating on a virtualization host may be configured to specifically run on that virtualization host. The virtual machine may make specific requests for a host resource by naming a host resource specific to that virtualization host. If that virtual machine is moved from a source virtualization host to a target virtualization host, the virtual machine may be reconfigured to operate on the target virtualization host. An allocation request from the virtual machine may not produce the proper result in the target virtualization host without reconfiguration.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a portable virtual machine using a generic resource allocation request to access a host resource. A virtualization host may receive a generic resource allocation request from a portable virtual machine. The virtualization host may provide a host resource to the portable virtual machine based on the generic resource allocation request.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 illustrates, in a block diagram, one embodiment of a computing device.

FIGS. 2A-B illustrate, in block diagrams, embodiments of a virtual machine accessing host resources.

FIGS. 3A-D illustrates, in a series of block diagrams, one embodiment of a virtual machine transfer using reconfiguration.

FIG. 4 illustrates, in a block diagram, one embodiment of a generic resource allocation request.

FIGS. 5A-C illustrates, in a series of block diagrams, one embodiment of a portable virtual machine transfer.

DETAILED DESCRIPTION

Figure 1:
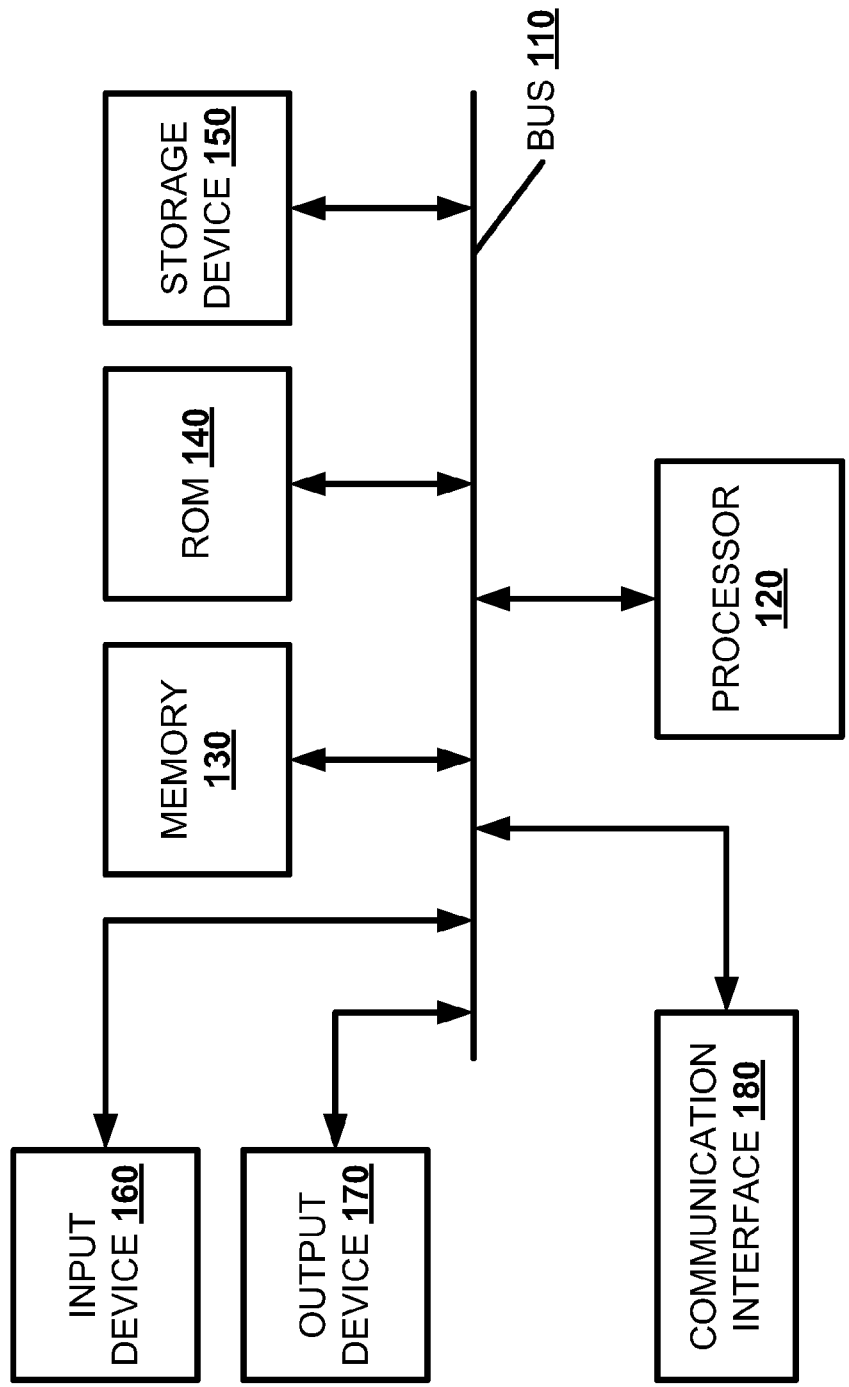

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a virtualization host for a computing device.

Through the use of resource pools, a portable virtual machine may eliminate the tight coupling between a virtual machine configuration and the host resources of a specific host. Resource pools may act as an abstraction layer between the physical characteristics of a system and the requests of the virtual machine. The virtualization host may either assign the host resources directly to a resource pool, or lend part or all of the host resource capacity to the resource pool. The portable virtual machine may then reference a resource pool and specify the functional characteristics of the requested allocation, rather than having to reference a specific resource directly.

In this way, the virtual machine may move from one host system, referred to as a source virtualization host, to another host system, referred to as a target virtualization host, without reconfiguration. The source virtualization host and the target virtualization host may have the same resource pool topology aggregating the host resources. Each resource pool may be uniquely identifiable on a particular virtualization host. The virtual machine configuration may reference a specific resource pool.

The virtual machine configuration may also contain a resource criterion or a configuration specification. For instance, the virtual machine configuration may specify a specific network, using a particular virtual local area network identifier, and having at least a minimum amount of bandwidth. The resource pool may use this information to find a host resource capable of connecting to the specified network with the bandwidth available.

Upon selection, a resource pool may configure the host resource to use the specified virtual local area network identifier and reserve the bandwidth for the virtual machine before making the host resource available to the virtual machine. The virtualization host may allocate and connect the host resource to the virtual machine dynamically, leaving the virtual machine configuration unchanged.

If multiple resources may meet the resource criterion, the resource pool may apply a distribution calculation for determining which host resource to select, such as a load balancing calculation, a priority calculation, an availability calculation, or a consolidation calculation. A distribution calculation is any calculation used to determine the proper use of a set of resources, such as a load balancing calculation, a priority calculation, or an availability calculation. A load balancing calculation determines an even distribution of resources. A priority calculation determines if a virtual machine has initial choice of higher performance resources. An availability calculation reallocates other resources when that resource was not available. A consolidation calculation determines an optimal grouping of the resources for the virtual machine.

The portable virtual machine may move seamlessly between virtualization hosts. A user or management client may create symmetrical resource pools, with matching aliases, on each host to which the virtual machine might be moved. Next, the resource pools may manage the host resources in whole or in part. The virtual machine may be instantiated upon any of these virtualization hosts without reconfiguration. Though the virtual machine may be remapped to different resources on each host, the level of abstraction provided by the resource pools may allow the virtual machine to remain agnostic of these details.

Thus, in one embodiment, a portable virtual machine may use a generic resource allocation request to access a host resource. A generic resource allocation request asks for a host resource without having to be reconfigured depending on the virtualization host. A virtualization host may receive a generic resource allocation request from a portable virtual machine. The virtualization host may provide a host resource to the portable virtual machine based on the generic resource allocation request.

FIG. 1 illustrates a block diagram of an exemplary computing device 100 which may act as a virtualization host. The computing device 100 may combine one or more of hardware, software, firmware, and system-on-a-chip technology to implement a virtualization host. The computing device 100 may include a bus 110, a processor 120, a memory 130, a read only memory (ROM) 140, a storage device 150, an input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method. The storage device 150 may also be a database or a database interface for storing a host resource profile.

The input device 160 may include one or more conventional mechanisms that permit a user to input information to the computing device 100, such as a keyboard, a mouse, a voice recognition device, a microphone, a headset, etc. The output device 170 may include one or more conventional mechanisms that output information to the user, including a display, a printer, one or more speakers, a headset, or a medium, such as a memory, or a magnetic or optical disk and a corresponding disk drive. The communication interface 180 may include any transceiver-like mechanism that enables computing device 100 to communicate with other devices or networks. The communication interface 180 may include a network interface or a mobile transceiver interface. The communication interface 180 may be a wireless, wired, or optical interface.

The computing device 100 may perform such functions in response to a processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2A:
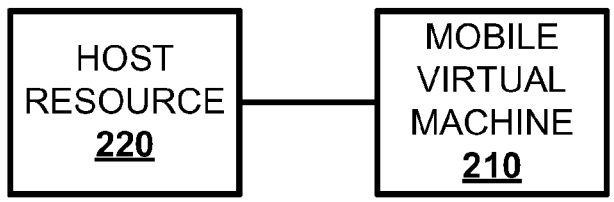

FIG. 2A illustrates, in a block diagram, one embodiment of a direct resource association 200. Normally, a virtual machine 210 may access a host resource 220 using information specific to the virtualization host in which the mobile virtual machine 210 operates. If a virtual machine 210 is being moved from a source virtualization host to a target virtualization host, a user or management client may specify how to transform the virtual machine configuration to reference a specific host resource 220 on the physical system of the target virtualization host. During this transformation, the user or management client may examine the resources on the target virtualization host to determine the suitable resources for the virtual machine 210. The user or management client may then modify the virtual machine configuration to reference the target host resources 220 before instantiating the virtual machine 210 in the target virtualization host.

Figure 2B:
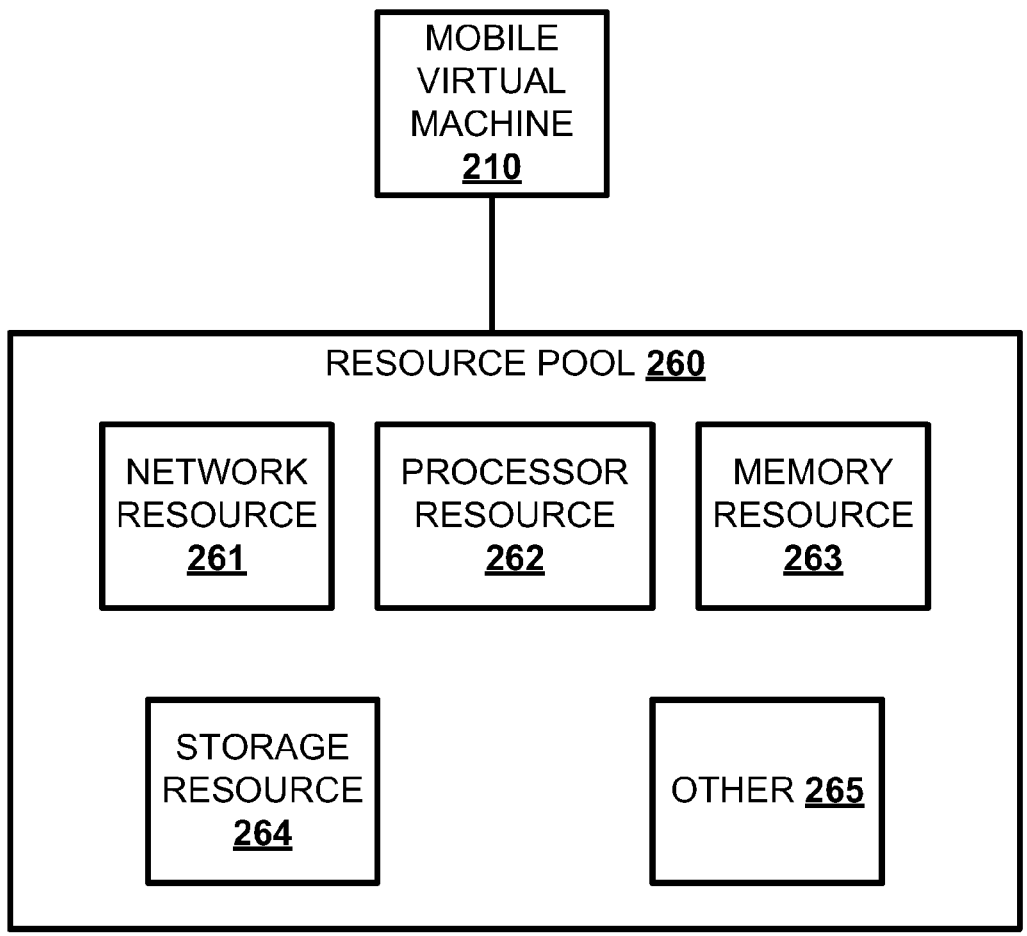

FIG. 2B illustrates, in a block diagram, one embodiment of an abstracted resource association 250. A resource pool 260 frees a virtual machine 210 from having to reference a specific host resource 220 directly. Instead, the resource pool 260 may function as a collection of host resources 220, presenting a set of capabilities to the virtual machines 210. The resource pool 260 may have an identifier that serves as an alias for this collection of host resources. Thus, the virtual machine 210 may be configured by specifying one or more resource criteria describing the capabilities of the host resources 220 and, by specifying an alias, the resource pool 260. When the virtual machine 210 is instantiated, the resource criteria may be passed to the resource pool 260 with the specified resource pool alias. The resource pool 260 may then select an appropriate host resource 220 from the resource pool collection. The virtual machine 210 may avoid gathering information about the configuration or runtime properties of the source virtualization host, examining or reconfiguring the resources on the target virtualization host, or modifying the virtual machine configuration in order to move between virtualization hosts.

By referencing a resource pool 260, the virtual machine 210 may skip reconfiguration before accessing a target virtualization host. The virtual machine 210 may make a generic resource allocation request to access one or more host resources represented by the resource pool 260 using a resource pool alias. The resource pool 260 may be associated with at least one of a networking resource 261, a processor resource 262, a memory resource 263, a storage resource 264, or other host resources 265. A resource pool 260 may be of a uniform type, such as a resource pool having just storage resources 264, or of a heterogeneous type, such as a resource pool having a network resource 261 and a processor resource 262.

Figure 3A:
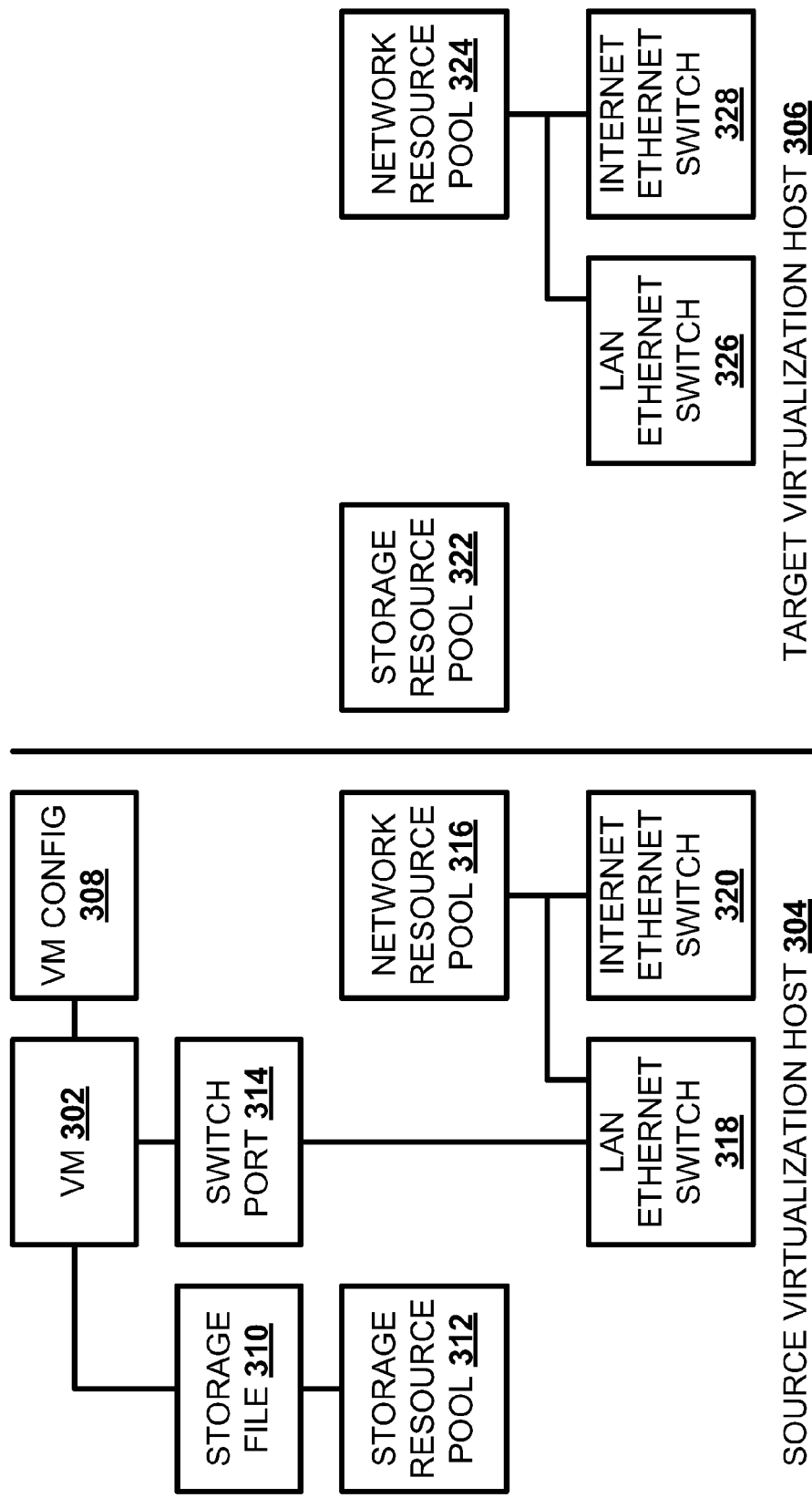

A virtual machine may be moved from a source virtualization host to a target virtualization host by reconfiguring the virtual machine for the new virtual environment. FIG. 3A illustrates, in a block diagram, one embodiment of the initial state 300 of a virtual machine transfer. A user may seek to transfer a virtual machine 302 from a source virtualization host 304 to a target virtualization host 306. The virtual machine 302 may have a source virtual machine configuration 308 in the source virtualization host 304. The source virtual machine configuration 308 describes the source host resources that the virtual machine 302 may be using. For example, the source virtual machine configuration 308 may list the resource pools as "Customer 1", the Ethernet port as "Port 1", and the storage location as "C:\MyFile.ext".

Based on this virtual machine configuration 308, the virtual machine 302 may access a storage file 310 located in a path of "C:\MyFile.ext", kept by a storage resource pool 312 at the storage resource for "Customer 1". The virtual machine 302 may access a source switch port 314 at "Port 1," with a virtual local area network (VLAN) identifier of 12, a bandwidth of 1 gigabyte, and acceleration enabled. The source switch port 314 may use a network resource pool 316 for "Customer 1" having a source local area network (LAN) Ethernet switch 318 and a source internet Ethernet switch 320. Because of the source virtual machine configuration 308, the switch port 314 may select to use the local area network Ethernet switch 318.

The target virtualization host 306 may have a target storage resource pool 322 for "Customer 1". The target virtualization host 306 may also have a target network resource pool 324 for "Customer 1" associated with a target local area network Ethernet switch 326 and a target internet Ethernet switch 328. The location of the host resources associated with the target storage resource pool 322 and the target network resource pool 324 may not be located in the same place as the source storage resource pool 312 and the source network resource pool 316.

Figure 3B:
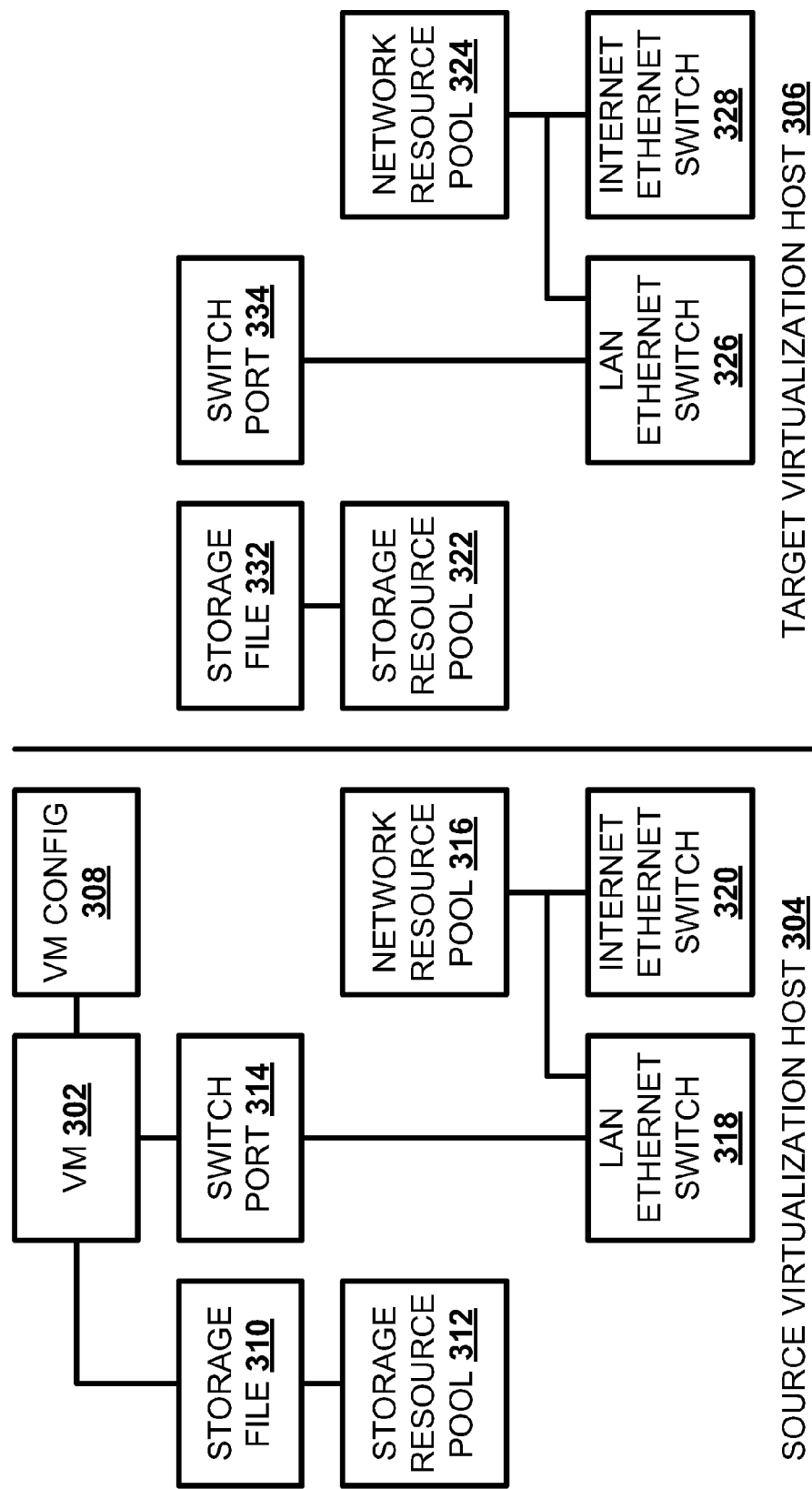

FIG. 3B illustrates, in a block diagram, one embodiment of the configuration state 330 of a virtual machine transfer. In this state, the target virtualization host 306 may be configured to match the source virtualization host 304. For example, the target virtualization host 306 may copy the source storage file 310 to create a target storage file 332, having a storage location path of "F:\MyFile.ext". The target virtualization host 306 may create and configure a target switch port 334 in the target virtualization host 306. The target switch port 334 may be at "Port 2," with a virtual local area network identifier of 12, a bandwidth of 1 gigabyte, and acceleration enabled. Since the switch port configuration is not part of the virtual machine configuration, the target virtualization host 306 may gather the switch port information through other techniques. Note that the path to the target storage file 332 and the name of the target switch port 334 may be different, as file systems may have a different structure and switch port names may be unique across data centers.

Figure 3C:
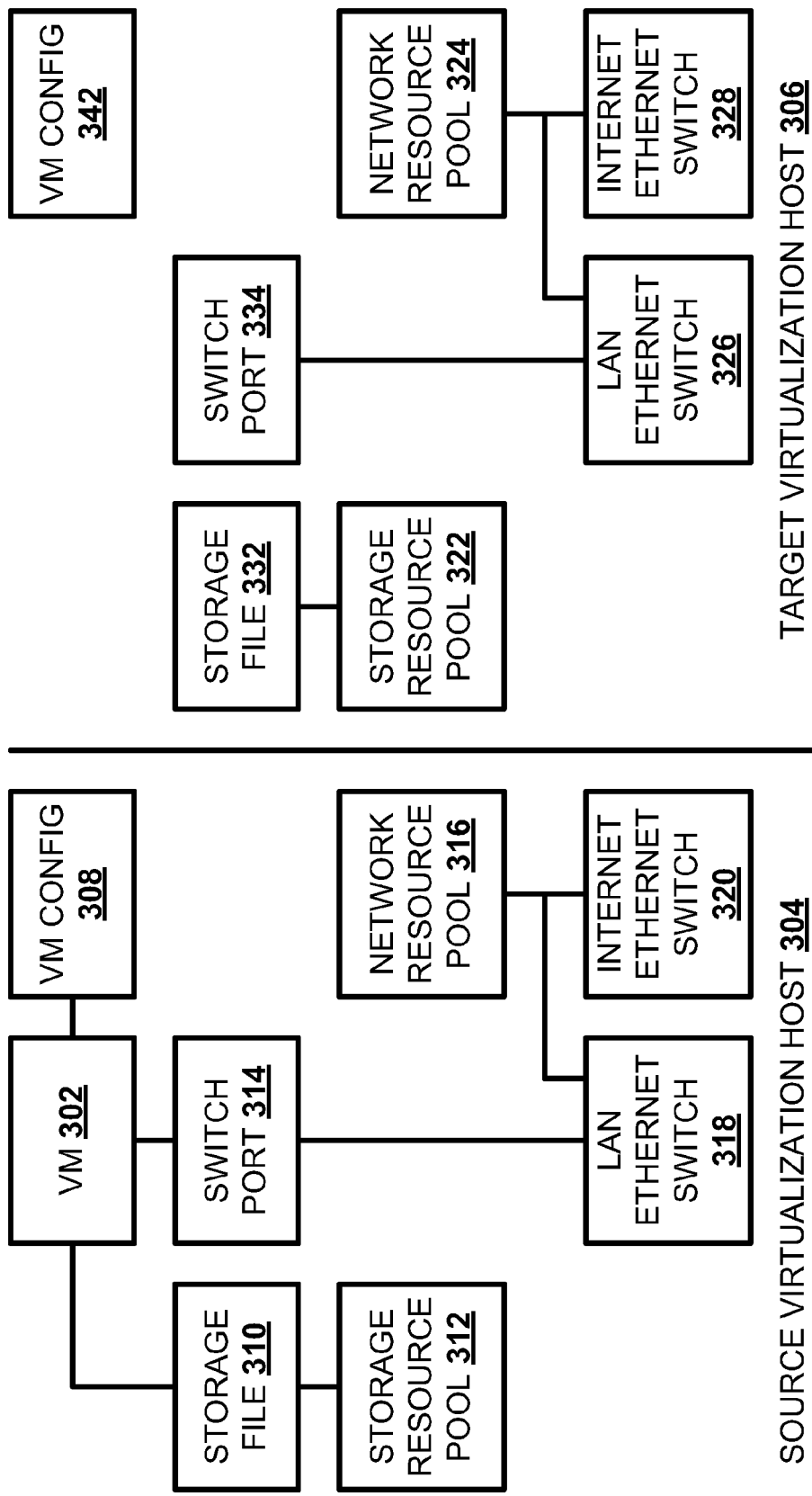

FIG. 3C illustrates, in a block diagram, one embodiment of the modification state 340 of a virtual machine transfer. The source virtual machine configuration 308 may be copied to the target virtualization host 306 to create the target virtual machine configuration 342. The target virtual machine configuration 342 may be modified to reflect changes to the storage location and the switch port name. For example, the target virtual machine configuration 342 may list the resource pools as "Customer 1", the Ethernet port as "Port 2", and the storage location as "F:\MyFile.ext".

Figure 3D:
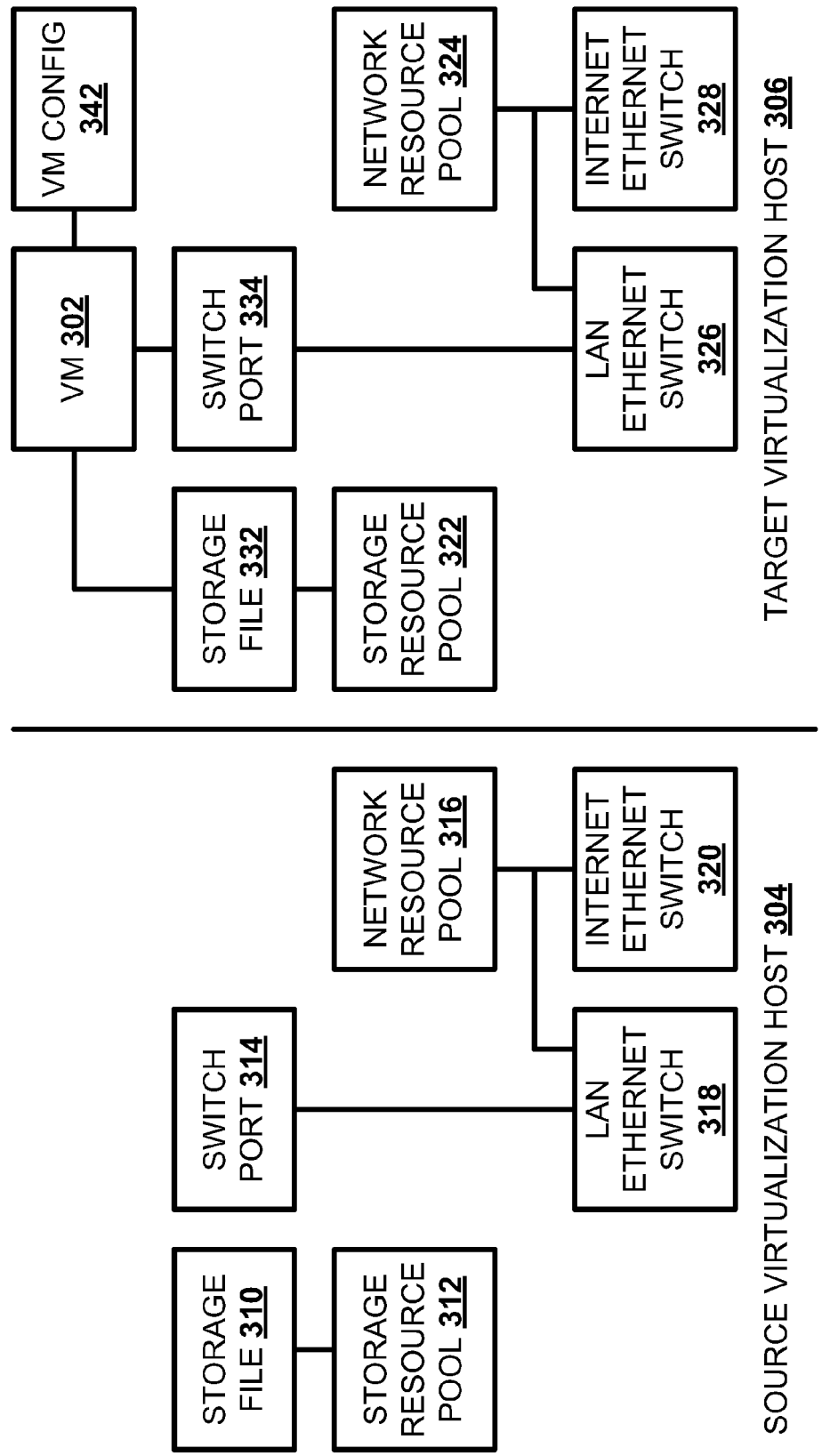

FIG. 3D illustrates, in a block diagram, one embodiment of the final state 350 of a virtual machine transfer. In the final state 350, a copy of the virtual machine 302 is moved from the source virtualization host 304 to the target virtualization host 306. The virtual machine 302 may transfer because of the modification to the virtual machine configuration. If a copy of the virtual machine 302 is left on the source virtualization host 304, the identifier for the virtual machine 302 may be changed to differentiate between the virtual machine 302 on the source virtualization host 304 and the target virtualization host 306.

By using the resource pool to create a level of abstraction between the host resources and the mobile virtual machine, a mobile virtual machine may use a generic resource allocation request to move between virtualization hosts without reconfiguration. A generic resource allocation request asks for a host resource without having to be reconfigured depending on the virtualization host. Instead, the generic resource allocation request may request a resource pool, using a resource pool alias. The resource pool alias may allow the virtualization host to supply the host resource while allowing the virtual machine to use the same generic resource allocation request on multiple virtualization hosts. FIG. 4 illustrates, in a block diagram, one embodiment of a generic resource allocation request 400. The generic resource allocation request 400 may have a virtual machine identifier (VM ID) 410 to identify the virtual machine requesting the host resource. The generic resource allocation request 400 may have a resource pool alias 420 identifying the resource pool. The generic resource allocation request 400 may have a configuration specification 430 describing how to configure the host resource for use by the virtual machine. The generic resource allocation request 400 may have a resource criterion 440 to guide the virtualization host in selecting a host resource for the virtual machine.

Figure 5A:
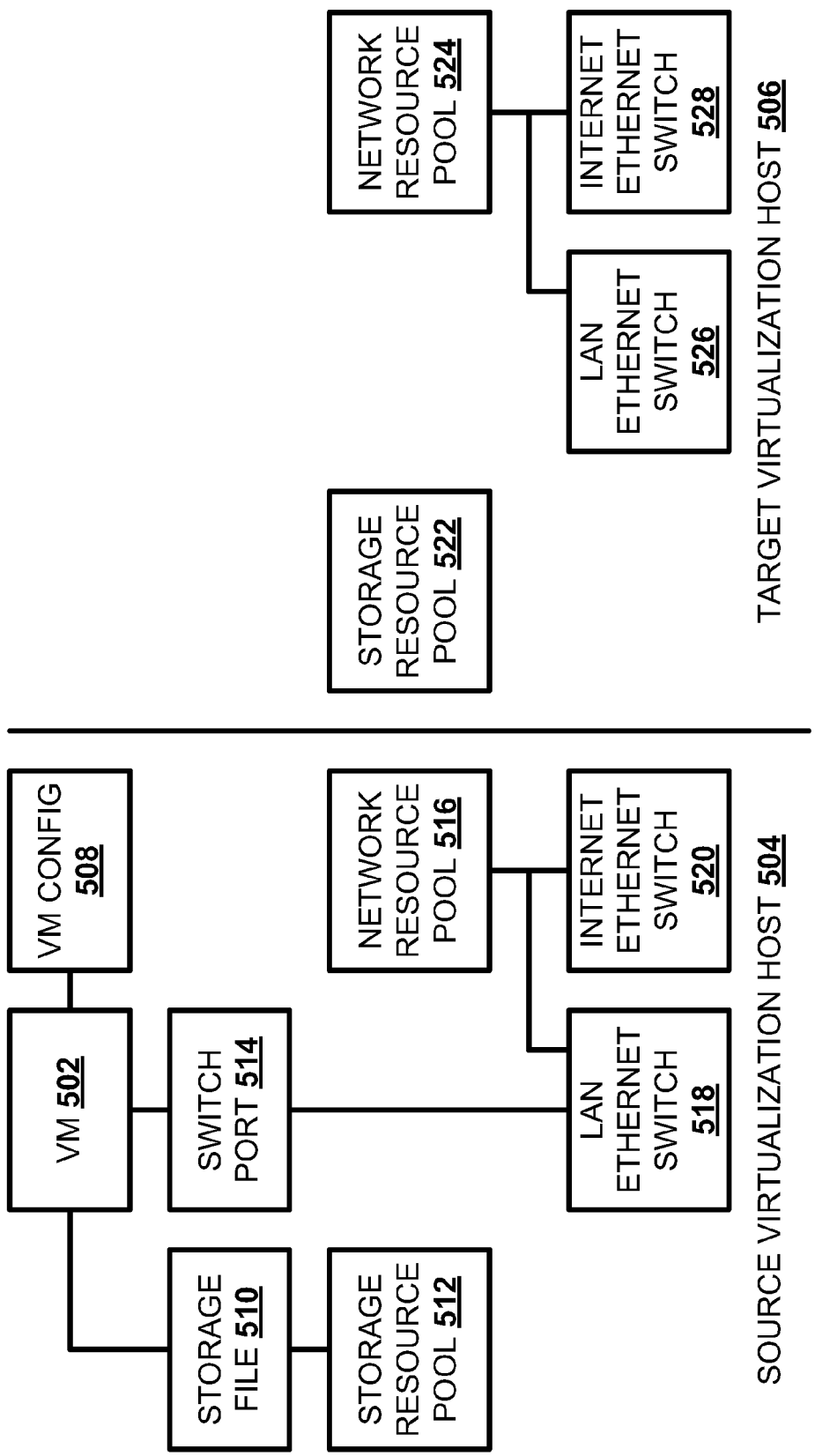

By using the generic resource allocation request, a mobile virtual machine may be moved between virtualization hosts without reconfiguration. FIG. 5A illustrates, in a block diagram, one embodiment of the initial state 500 of a virtual machine transfer. A user may seek to transfer a virtual machine 502 from a source virtualization host 504 to a target virtualization host 506. The virtual machine 502 may have a virtual machine configuration 508 accessible in the source virtualization host 504. The virtual machine configuration 508 describes the functional characteristics of the host resources that the virtual machine 502 may be using. For example, the virtual machine configuration 508 may list the resource pools as "Customer 1", a connection as "local area network", a virtual local network identifier of 12, bandwidth of 1 gigabyte, acceleration enabled, and the storage file as "MyFile.ext".

Based on this virtual machine configuration 508, the virtual machine 502 may access a storage file 510 located in a path of "C:\MyFile.ext", kept by a storage resource pool 512 at the storage resource for "Customer 1" with a path of "C:\". The virtual machine 502 may access a source switch port 514 at "Port 1," with a virtual local area network identifier of 12, a bandwidth of 1 gigabyte, and acceleration enabled. The source switch port 514 may use a network resource pool 516 for "Customer 1" having a source local area network Ethernet switch 518 and a source internet Ethernet switch 520. Because of the virtual machine configuration 508, the switch port 514 may select to use the local area network Ethernet switch 518.

Rather than specifying a specific switch port 514, the virtual machine configuration 508 may detail the connectivity, virtual local area network, bandwidth, and acceleration for proper functionality. Similarly, the virtual machine configuration 508 may name the storage file 510 or describe the characteristics of the storage, such as the size of the file, but not the path to that file.

The target virtualization host 506 may have a target storage resource pool 522 for "Customer 1" having a path of "F:\". The target virtualization host 506 may also have a target network resource pool 524 for "Customer 1" associated with a target local area network Ethernet switch 526 and a target internet Ethernet switch 528. The location of the host resources associated with the target storage resource pool 522 and the target network resource pool 524 may not be located in the same place as the source storage resource pool 512 and the source network resource pool 516.

Figure 5B:
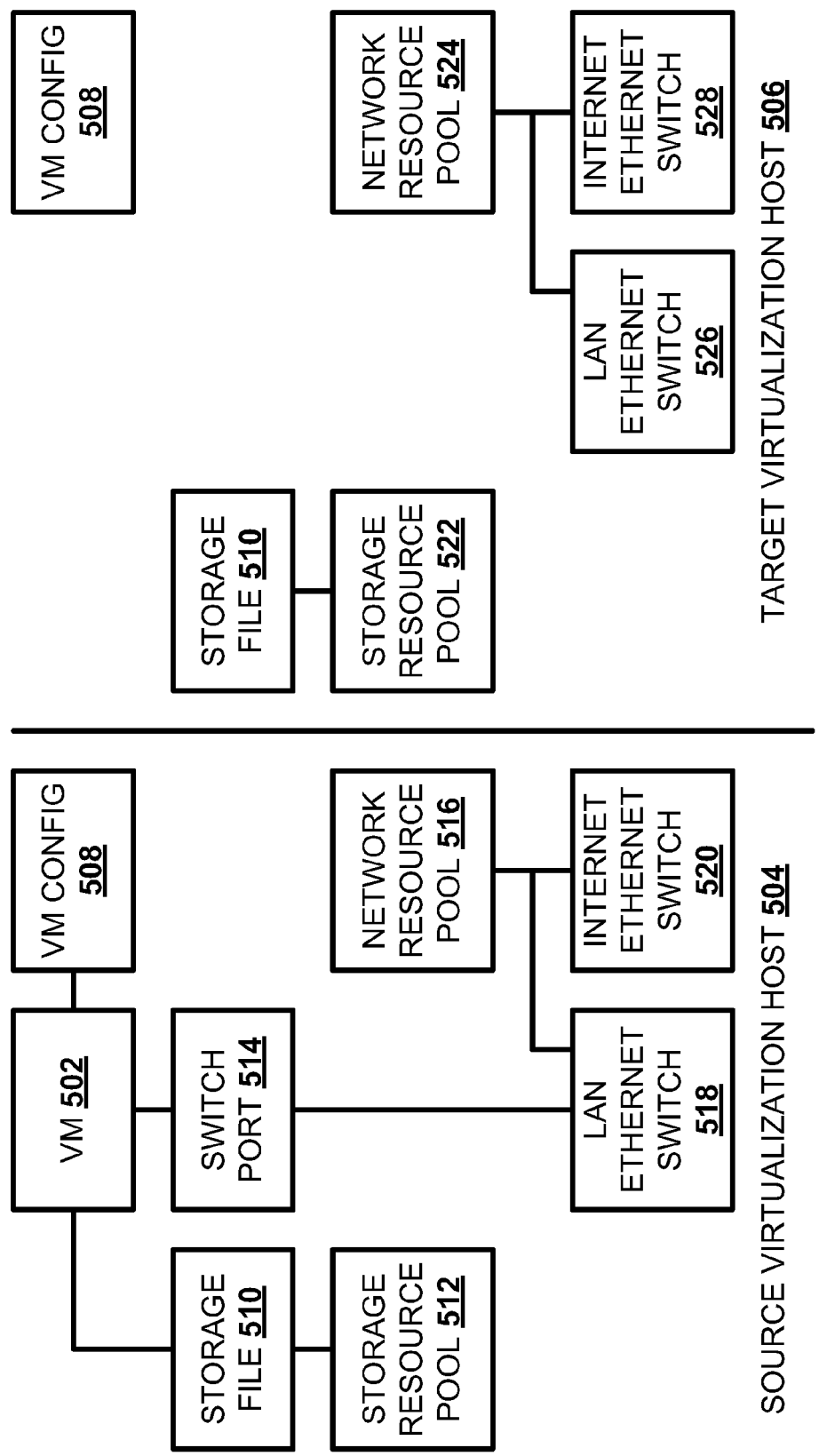

FIG. 5B illustrates, in a block diagram, one embodiment of the configuration state 530 of a virtual machine transfer. In this state, the target virtualization host 506 may be configured to match the source virtualization host 504. For example, the target virtualization host 506 may map a path to the storage file 510, having a storage location path of "F:\MyFile.ext". The target virtualization host 506 may access the same virtual machine configuration 508 as the source virtualization host 504. The virtual machine configuration 508 may be unchanged between the source virtualization host 504 and the target virtualization host 506.

Figure 5C:
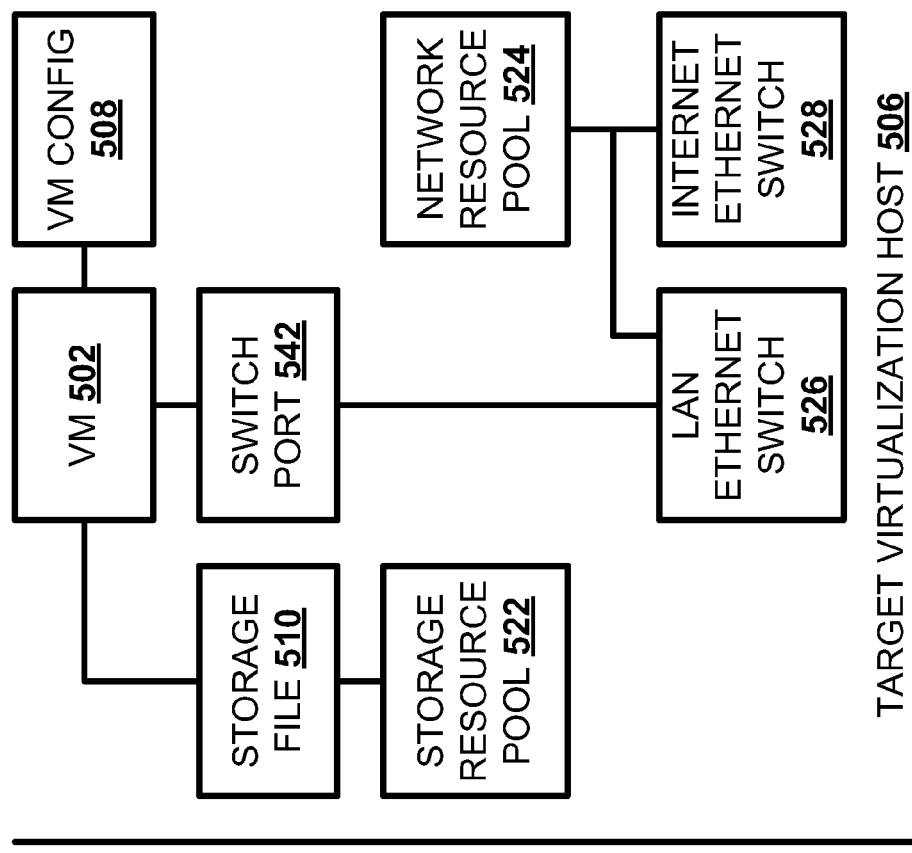
Figure 5C:
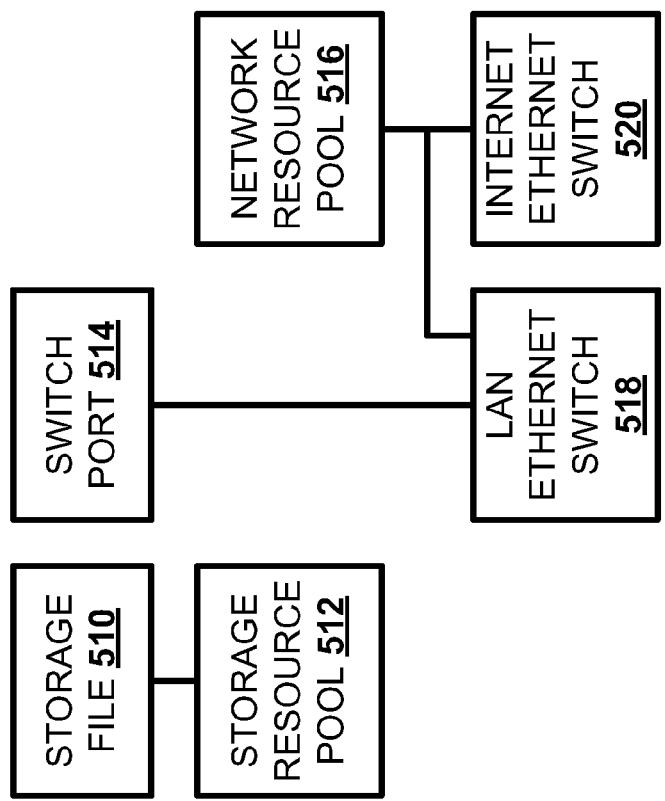

FIG. 5C illustrates, in a block diagram, one embodiment of the final state 540 of a virtual machine transfer. In the final state 540, the target virtualization host 506 may create and configure a target switch port 542. The target network resource pool 524 may find an Ethernet switch with the connectivity specified by the target virtual machine configuration 534. The target switch port 542 may be at "Port 2," with a virtual local area network identifier of 12, a bandwidth of 1 gigabyte, and acceleration enabled. Similarly, the target storage resource pool 522 locates the storage file "MyFile.ext" by looking within the file system path specified in the target storage resource pool 522. The virtual machine 502 is moved from the source virtualization host 504 to the target virtualization host 506. If a copy of the virtual machine 502 is left on the source virtualization host 504, the identifier for the virtual machine 502 may be changed to differentiate between the virtual machine 502 on the source virtualization host 504 and the virtual machine 502 on the target virtualization host 506.

Figure 6:
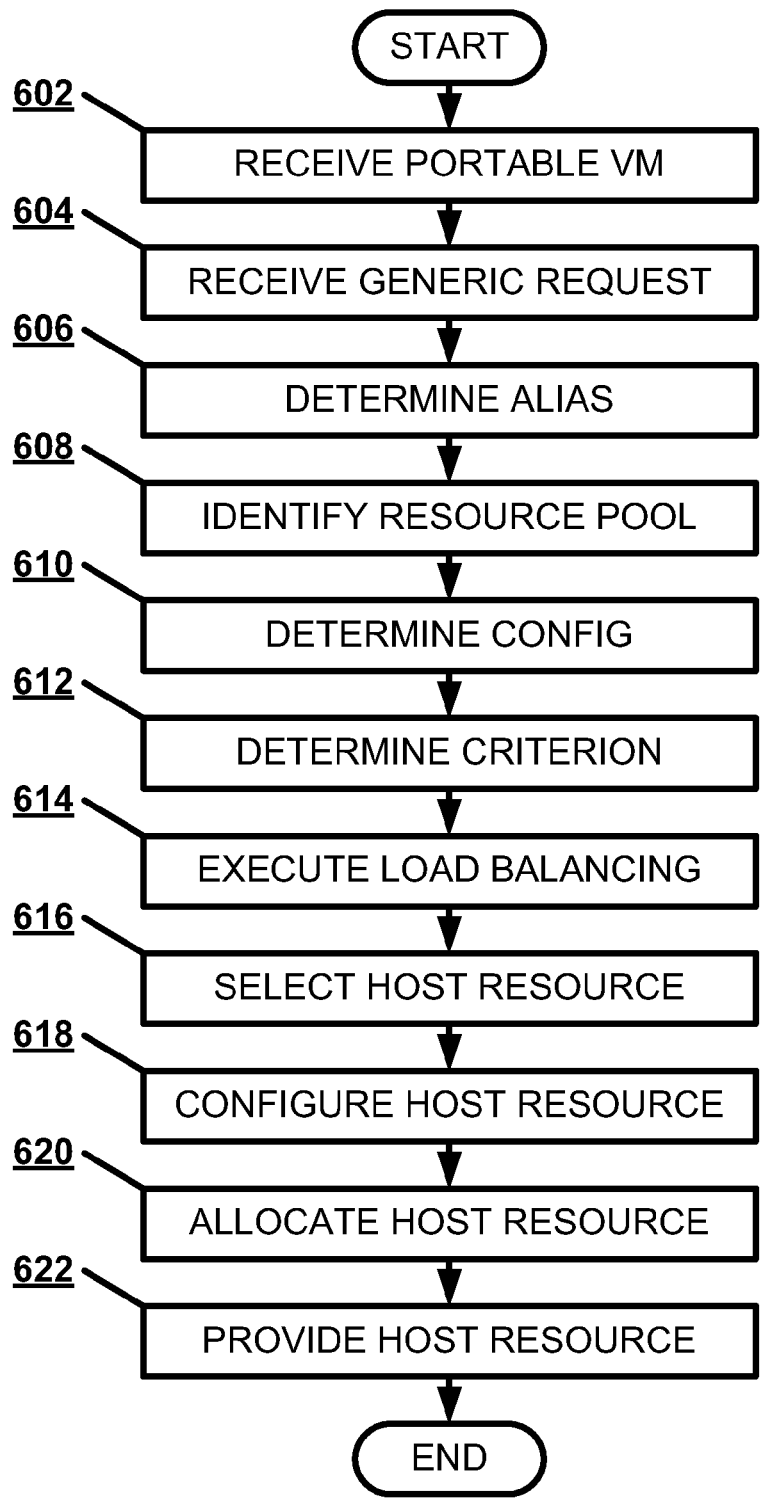
FIG. 6 illustrates, in a flowchart, one embodiment of a method of providing a host resource in a virtualization host.

FIG. 6 illustrates, in a flowchart, one embodiment of a method 600 of providing a host resource in a virtualization host. The virtualization host may receive a portable virtual machine from a source virtualization host (Block 602). The virtualization host may receive a generic resource allocation request from the portable virtual machine (Block 604). The virtualization host may determine a resource pool alias from the generic resource allocation request (Block 606). The virtualization host may identify a resource pool from the resource pool alias of the generic resource allocation request (Block 608). The virtualization host may determine a configuration specification from the generic resource allocation request (Block 610). The virtualization host may determine a resource criterion from the generic resource allocation request (Block 612). The virtualization host may execute a distribution calculation on the host resources in the resource pool (Block 614). The virtualization host may select the host resource based on the resource criterion and the distribution calculation (Block 616). The virtualization host may configure the host resource based on the configuration specification (Block 618). The virtualization host may allocate the host resource based on the resource pool (Block 620). The host resource may be at least one of a network resource, a processor resource, a memory resource, a storage resource, or other host resource. The virtualization host may provide a host resource to the portable virtual machine based on the generic resource allocation request (Block 622).

Figure 7:
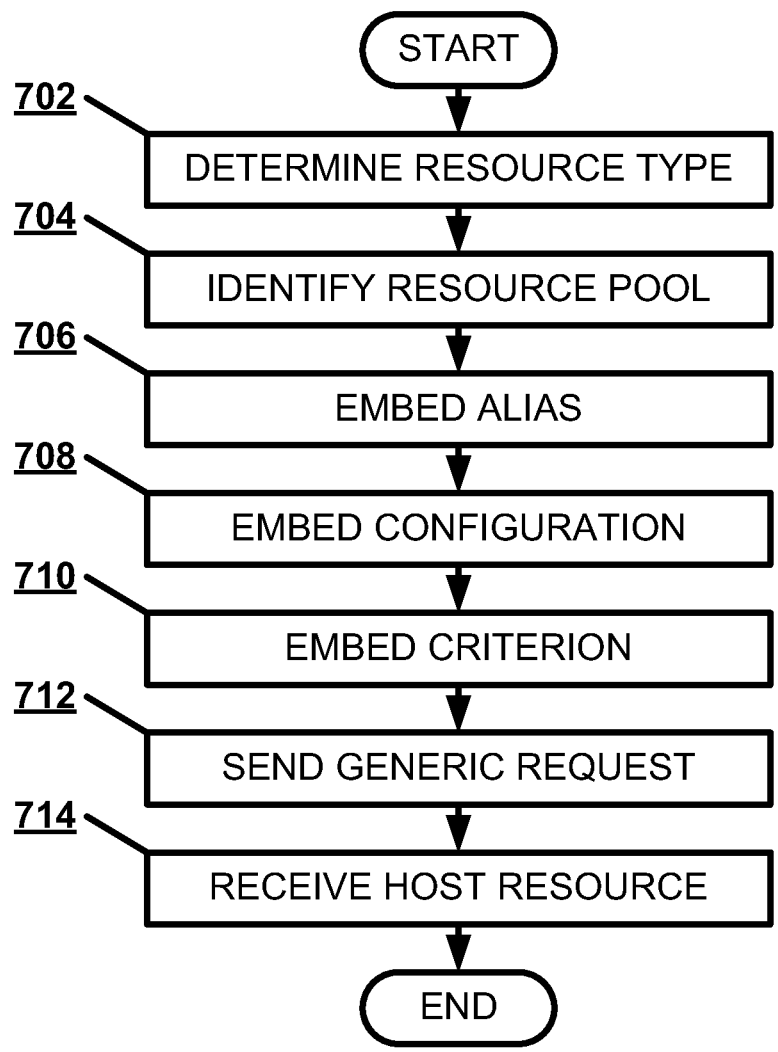
FIG. 7 illustrates, in a flowchart, one embodiment of a method of receiving a host resource in a portable virtual machine.

FIG. 7 illustrates, in a flowchart, one embodiment of a method 700 of receiving a host resource in a portable virtual machine. The portable virtual machine may determine a resource type to be used by the virtual machine (Block 702). For example, the resource type may be at least one of a network resource, a processor resource, a memory resource, a storage resource, or other host resource. The portable virtual machine may identify a resource pool providing a resource type (Block 704). The portable virtual machine may embed a resource pool alias identifying the resource pool in the generic resource allocation request (Block 706). The portable virtual machine may embed a configuration specification in the generic resource allocation request (Block 708). The portable virtual machine may embed a resource criterion in the generic host request (Block 710). The portable virtual machine may send a generic resource allocation request from a portable virtual machine to a virtualization host (Block 712). The portable virtual machine may receive a host resource form the virtualization host based on the generic resource allocation request (Block 714).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A machine-implemented method, comprising:

creating, on a target virtualization host, at least one resource pool representing a collection of host resources of the target virtualization host and having an identifier, wherein the at least one resource pool is configured to be symmetric with one or more other resource pools respectively created on one or more virtualization hosts other than the target virtualization host such that identifier of the resource pool on each host is the same as the identifier on each other host of the one or more other virtualization hosts and the target virtualization host;

receiving, at the target virtualization host, a generic resource allocation request from a portable virtual machine operating on one of the virtualization hosts, wherein a generic resource allocation request comprises a resource allocation request configured to specify the symmetrical resource pool identifier which allows the generic resource allocation request to be used across the virtualization hosts without modification; and allocating, in response to receiving the generic resource allocation request, a host resource of the target virtualization host to the portable virtual machine from the resource pool specified by the generic resource allocation request.

2. The method of claim 1, further comprising:
receiving the portable virtual machine from a source virtualization host of the plurality of virtualization hosts.

3. The method of claim 1, further comprising:
accessing with the target virtualization host of the plurality of virtualization hosts a virtual machine configuration unchanged from a source virtualization host of the plurality of virtualization hosts.

4. The method of claim 1, further comprising:
moving the portable virtual machine to the target virtualization host and resuming operation of the portable virtual machine at the target virtualization host, wherein the portable virtual machine is moved without first examining the host resource configuration of the target virtualization host and without modifying a virtual machine configuration of the portable virtual machine by referencing the symmetrical resource pool.

5. The method of claim 1,
wherein the host resources are at least one of a network resource, a processor resource, a memory resource, and a storage resource.

6. The method of claim 1, further comprising:
determining a configuration specification from the generic resource allocation request.

7. The method of claim 6, further comprising:
configuring the host resource that is to be allocated to the portable virtual machine in response to the received generic resource allocation request based on the configuration specification.

8. The method of claim 1, further comprising:
determining a resource criterion from the generic resource allocation request.

9. The method of claim 1,
wherein the host resource to be allocated to the portable virtual machine in response to the received generic resource allocation request is selected from the resource pool based on the resource criterion.

10. The method of claim 1,
wherein the host resource to be allocated to the portable virtual machine in response to the received generic resource allocation request is selected from the resource pool based on at least one of a load balancing calculation, a priority calculation, an availability calculation, and a consolidation calculation.

11. A hardware machine-readable storage device having a set of instructions detailing a method stored thereon that when executed by one or more processors cause the one or more processors to perform the method, the method comprising:
creating, on a target virtualization host, at least one resource pool representing a collection of host resources of the target virtualization host and having an identifier, wherein the at least one resource pool is configured to be symmetric with one or more other resource pools respectively created on one or more virtualization hosts other than the target virtualization host such that identifier of the resource pool on each host is the same as the identifier on each other host of the one or more other virtualization hosts and the target virtualization host;

receiving, at the target virtualization host, a generic resource allocation request from a portable virtual machine operating on one of the virtualization hosts, wherein a generic resource allocation request comprises a resource allocation request configured to specify the symmetrical resource pool identifier which allows the generic resource allocation request to be used across the virtualization hosts without modification; and allocating, in response to receiving the generic resource allocation request, a host resource of the target virtualization host to the portable virtual machine from the resource pool specified by the generic resource allocation request.

12. The hardware machine-readable storage device of claim 11, wherein the method further comprises:
moving the portable virtual machine to the target virtualization host and resuming operation of the portable virtual machine at the target virtualization host, wherein the portable virtual machine is moved without first examining the host resource configuration of the target virtualization host and without modifying a virtual machine configuration of the portable virtual machine by referencing the symmetrical resource pool.

13. The hardware machine-readable storage device of claim 11, wherein
the collection of host resources represented by the at least one resource pool is of a uniform resource type.

14. The hardware machine-readable storage device of claim 11, wherein the
generic resource allocation request further includes a configuration specification.

15. The hardware machine-readable storage device of claim 11, wherein the
generic resource allocation request further includes a resource criterion.

16. A system, comprising:
a processor; and
a machine-readable storage device comprising instructions which, when executed by the processor, causes the processor to perform a method, the method comprising:
creating, on a target virtualization host, at least one resource pool representing a collection of host resources of the target virtualization host and having an identifier, wherein the at least one resource pool is configured to be symmetric with one or more other resource pools respectively created on one or more virtualization hosts other than the target virtualization host such that identifier of the resource pool on each host is the same as the identifier on each other host of the one or more other virtualization hosts and the target virtualization host;

receiving, at the target virtualization host, a generic resource allocation request from a portable virtual machine operating on one of the virtualization hosts, wherein a generic resource allocation request comprises a resource allocation request configured to specify the symmetrical resource pool identifier which allows the generic resource allocation request to be used across the virtualization hosts without modification; and allocating, in response to receiving the generic resource allocation request, a host resource of the target virtualization host to the portable virtual machine from the resource pool specified by the generic resource allocation request.

17. The system of claim 16, wherein the generic resource allocation request has at least one of a configuration specification and a resource criterion.

18. The system of claim 16, wherein the processor executes at least one of a load balancing calculation, a priority calculation, an availability calculation and a consolidation calculation to select the host resource to be allocated from the specified resource pool to the portable virtual machine.

19. The system of claim 16, wherein the method further comprises:
    moving the portable virtual machine to the target virtualization host and resuming operation of the portable virtual machine at the target virtualization host, wherein the portable virtual machine is moved without first examining the host resource configuration of the target virtualization host and without modifying a virtual machine configuration of the portable virtual machine by referencing the symmetrical resource pool.

20. The system of claim 16, wherein the wherein the host resources are at least one of a network resource, a processor resource, a memory resource, and a storage resource.

* * * * *